Aug. 25, 1925.
D. F. WINTERLING
BRAKE
Filed Nov. 28, 1921
1,551,449
2 Sheets-Sheet 2
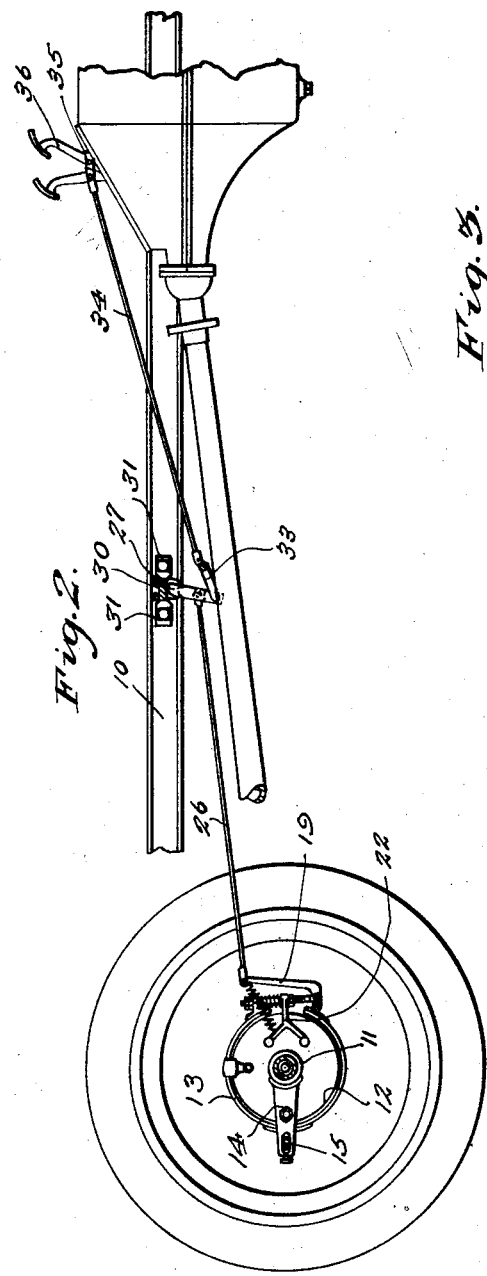
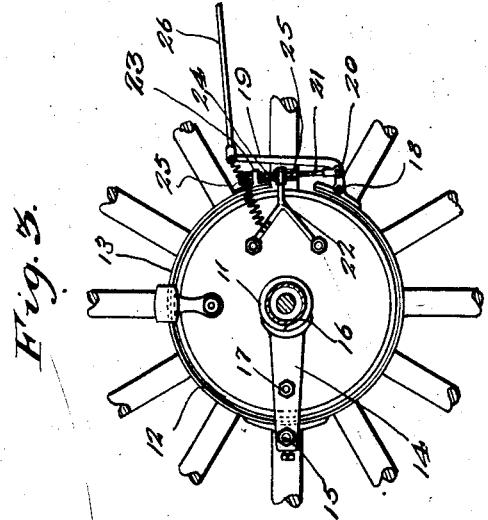
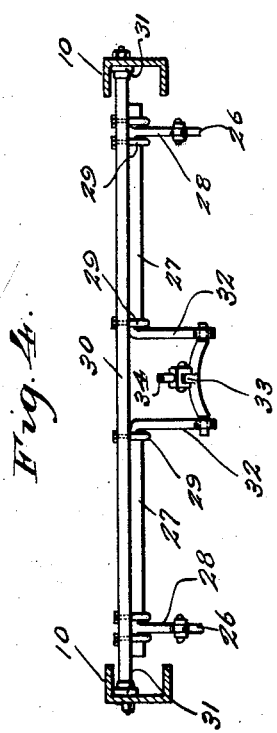
D. F. Winterling INVENTOR
BY Victor J. Evans ATTORNEY
WITNESSES Patented Aug. 25, 1925.

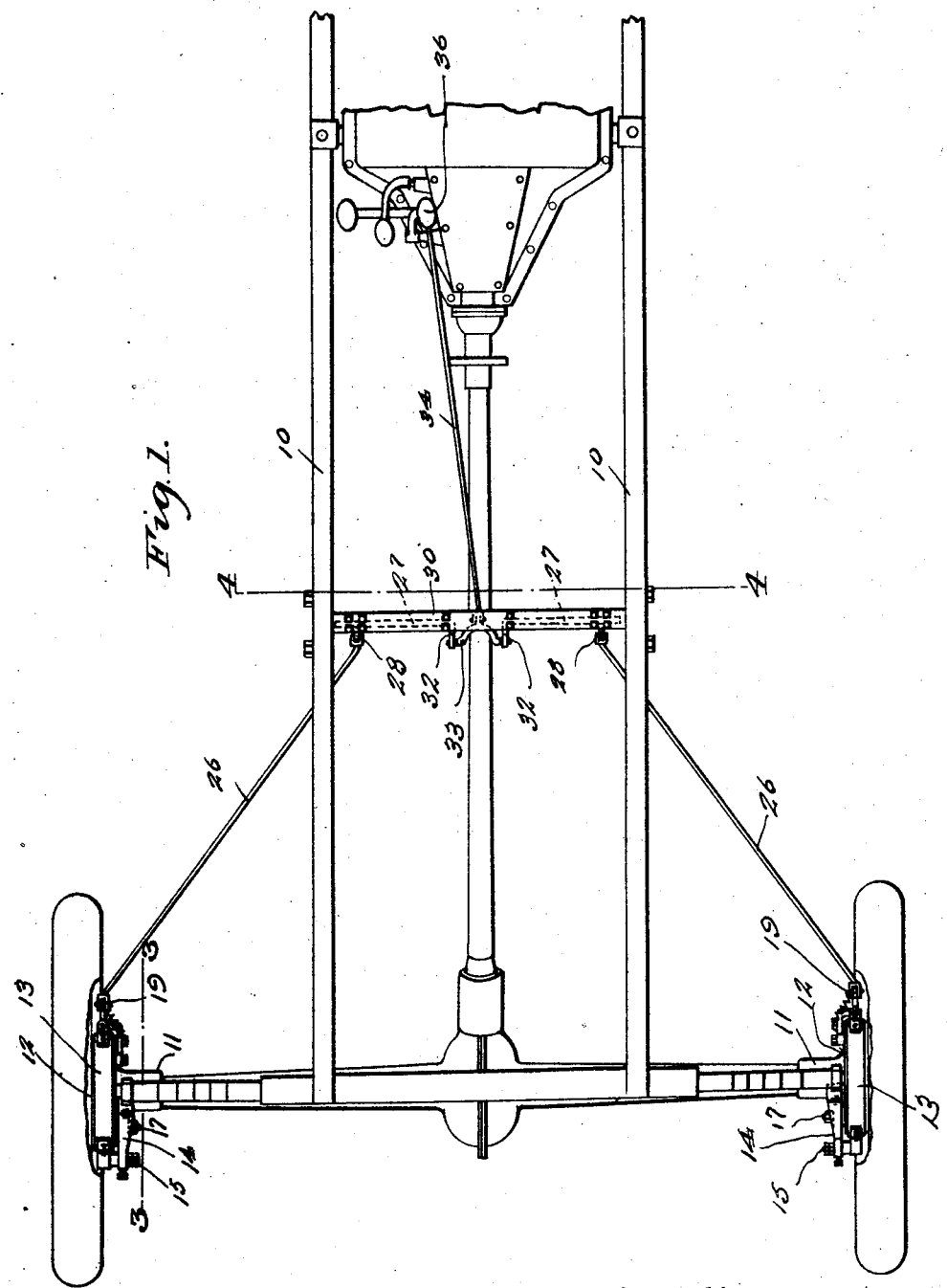

1,551,449

UNITED STATES PATENT OFFICE.

DENNIS F. WINTERLING, OF DRY RIDGE, KENTUCKY.

BRAKE.

Application filed November 28, 1921. Serial No. 518,339.

*To all whom it may concern:*

Be it known that I, DENNIS F. WINTERLING, a citizen of the United States, residing at Dry Ridge, in the county of Grant and State of Kentucky, have invented new and useful Improvements in Brakes, of which the following is a specification.

This invention relates to improvements in brakes for vehicles, an object of the invention being to provide an improved brake which is especially designed for application to automobiles and which will eliminate objectionable chattering of the brakes and bring the vehicle to a steady, even stop.

Another object of the invention is the provision of a brake of this character which will operate as an external contracting brake from the pedal of the service brake.

With the above and other objects in view, the invention further includes the following novel features and details of construction, to be hereinafter more fully described, illustrated in the accompanying drawings and pointed out in the appended claim.

In the drawings:—

Figure 1 is a plan view of the chassis of an automobile showing the invention applied.

Figure 2 is a central longitudinal sectional view.

Figure 3 is an enlarged section on the line 3—3 of Figure 1.

Figure 4 is a transverse section on the line 4—4 of Figure 1.

Referring in detail to the drawings, wherein like characters of reference denote corresponding parts, the reference character 10 indicates the side members of an automobile frame, 11 the rear axle housing and 12 the brake drum, the construction being substantially the same as that used in a well known make of automobile.

In automobiles of this make, the service brake, that is, the brake controlled by the foot pedal operates on the transmission and after short use, frequently becomes worn to an extent that when applied will intermittently grip and release. This results in what is commonly known as chattering and brings the car to a stop in a jerky, uneven manner.

The present invention overcomes these disadvantages and provides a brake which operates upon the external surface of the brake drum and is controlled by the pedal service brake. To accomplish this there is provided a brake band 13 which surrounds the brake drum and is secured in place by means of a brake arm 14. One end of this arm is connected as shown at 15 to a lug carried by the brake band 13 and the opposite end of said arm is provided with a seat 16 for transverse engagement with the rear axle housing 11. A bolt 17 passing through the arm and connected to the brake drum serves to securely hold the brake arm in place.

Pivotally connected to one end of the brake band as shown at 18 is an arm 19 and pivotally connected to this arm as shown at 20, is one end of a rod 21. This rod operates through a bracket 22 which is suitably secured in place and has the end opposite that which is secured to the arm 19, passing through an opening provided in a lug 23, the latter being secured to the opposite end of the brake band 13. Surrounding the rod 21 and having its opposite ends bearing against the bracket 22 and the lug 23, is a coiled spring 24, while adjusting nuts 25 which are carried by the rod upon the opposite sides of the lug and bracket just mentioned, serve as a means of adjusting the brake band, when necessary or desired.

The opposite end of the arm 19 has connected thereto one end of a rod 26. As the construction just described is duplicated upon opposite sides of the vehicle, there will of course be two rods 26. The inner ends of these rods are connected to aligned rock shafts 27, which are disposed transversely of the vehicle, the said shafts being provided with short crank arms 28 for connection with these rods.

The rock shafts 27 are mounted within U-shaped bearing clips 29, whose ends are secured to a bar 30 which is disposed transversely between the side bars 10 of the vehicle frame and which is secured to the said bars as shown at 31. The inner ends of the rock shafts 27 are slightly spaced apart and extending from these ends is a relatively long crank arm 32. The outer ends of the crank arms 32 are connected by a yoke 33, the form of connection between these arms and the yoke being such as to permit of a limited amount of movement so as to permit of a limited amount of independent movement of the rock shafts 27. Connected to the yoke 33 is one end of a rod 34 and the opposite end of this rod is connected as shown at 35 to the brake pedal 36.

In the operation of the invention, when the brakes are applied by the use of the pedal 36, the bands 13 upon each side of the vehicle frame will be contracted and will evenly engage the drums 12. This is due to the equalizing action of the connection between the brake pedal 36 and the arms 19 and should one of the brake bands be applied in advance to the other, the form of connection between the yoke 33 and the rock shaft 27 will cause the pull to be directed to the said other brake band, so that the brakes will be evenly applied.

The invention is susceptible of various changes in its form, proportions and minor details of construction and the right is herein reserved to make such changes as properly fall within the scope of the appended claim.

Having described the invention, what is claimed is:—

The combination with a vehicle, of brakes located upon opposite sides thereof and each including a drum, means supporting a band upon the drum, a brake arm pivoted to one end of the band, a bar disposed transversely between the side chassis bars and having its ends secured to the side bars, a plurality of spaced U-bolts secured to the bar, a pair of rock shafts arranged in spaced relation on the shaft within the U-bolts and including long and short crank arms arranged upon the opposite ends thereof, an arcuate shaped yoke having outwardly extending trunnions upon the end portions thereof and pivotally received within the ends of the long crank arms, a rod pivotally connected to the intermediate portion of the arcuate shaped yoke and brake pedal, and a pair of brake rods associating the opposite ends of the brake arms and short crank arms.

In testimony whereof I affix my signature.

DENNIS F. WINTERLING.